United States Patent [19]
Paul

[11] Patent Number: 5,177,940
[45] Date of Patent: Jan. 12, 1993

[54] HORSE COVER
[76] Inventor: Kathleen B. Paul, 4315 Packard Dr., Jacksonville, Fla. 32216-6466
[21] Appl. No.: 651,200
[22] Filed: Feb. 6, 1991
[51] Int. Cl.$^5$ ................................................ B68C 5/00
[52] U.S. Cl. ...................................................... 54/79
[58] Field of Search ........................... 54/44, 65, 66, 79
[56] References Cited
U.S. PATENT DOCUMENTS

| | | | |
|---|---|---|---|
| 876,435 | 1/1908 | Caldwell | 54/79 |
| 1,218,004 | 3/1917 | Sayles | 54/79 |
| 4,671,049 | 6/1987 | Benckhuijsen | 54/79 |
| 4,683,709 | 8/1987 | Vasko et al. | 54/66 |

Primary Examiner—Robert P. Swiatek
Attorney, Agent, or Firm—Frank A. Lukasik

[57] ABSTRACT

The present invention is an oval shaped, quarter sheet providing hind quarter protection during long distance riding in foul weather, and comprising a pair of Velco straps for holding the quarter sheet to the saddle in a rolled up position and a tail strap for keeping the sheet in place.

4 Claims, 2 Drawing Sheets

HORSE COVER

FIELD OF THE INVENTION

This invention is related to a roll-up quarter sheet providing hind quarter protection for a horse during long distance riding in foul weather.

BACKGROUND OF THE INVENTION

It is known that cold, wet weather can be dangerous to an over-heated horse following hard work or a demanding performance. Covering the hind quarters with a cover prevents chilling and allows the heavy muscles to cool out slowly, helping to prevent muscle cramps and spasms.

A current, commercially available horse cover, such as the Swedish Hansbo Rug, which works as an under blanket, or traveling rug, has two distinct layers. The inner layer of polyester, wicks moisture away from the horse to the outer layer of cotton, where it evaporates. The Hansbo Rug is not adaptable to be used as a hind quarter cover while riding. It is better utilized as a cover for a horse which is inactive and not for short or long distance riding. Furthermore, the wicking and evaporation of moisture would cool the rug and chill the horse.

Another available back pad is made from wool with a half inch poly-felt fill and is designed to absorb perspiration. The back pad is designed primarily as a saddle blanket and not to protect the horse's hind quarters.

U.S. Pat. No. 688,203 discloses a harness shield attachment which is designed to be adjusted over the haunch of an animal and underneath the tail to hold a guard in place by buttons or other fastening devices on the harness and a securing attachment for the tail. The device is designed primarily to protect the harness from becoming fouled. The shield attachment would not provide weather protection for the horse nor could it be conveniently rolled up or folded away.

I have found however, that new, state-of-the-art materials used in other applications and properly designed are available to overcome the disadvantages of the prior art horse covers.

SUMMARY OF THE INVENTION

The present invention, (RUMP RUG $_{TM}$), is a roll up quarter sheet providing hind quarter protection during long distance riding in foul weather. The quarter sheet rolls up and fastens with Velcro closures behind the saddle. A tail strap keeps the quarter sheet in place. The invention can easily be unfolded or refolded and attached while mounted or off the horse. In addition, there is space for the endurance or trail rider to store a raincoat or jacket within the roll formed with the Velcro closure.

Accordingly, it is an object of the invention to provide a convenient, inexpensive, and effective hind quarter cover for a horse.

Another object of the invention is to provide a quarter sheet that is waterproof and washable.

A still further object of the invention is to provide a quarter sheet for a horse that is waterproof and permits small molecules of sweat to evaporate.

Yet another object of the invention is to provide a hind quarter cover made of GORE-TEX $_{TM}$ material.

These and other objects of the invention will become apparent to those skilled in the art to which the invention pertains when taken in light of the annexed drawings.

DESCRIPTION OF THE PREFERRED EMBODIMENT

Figure 1:
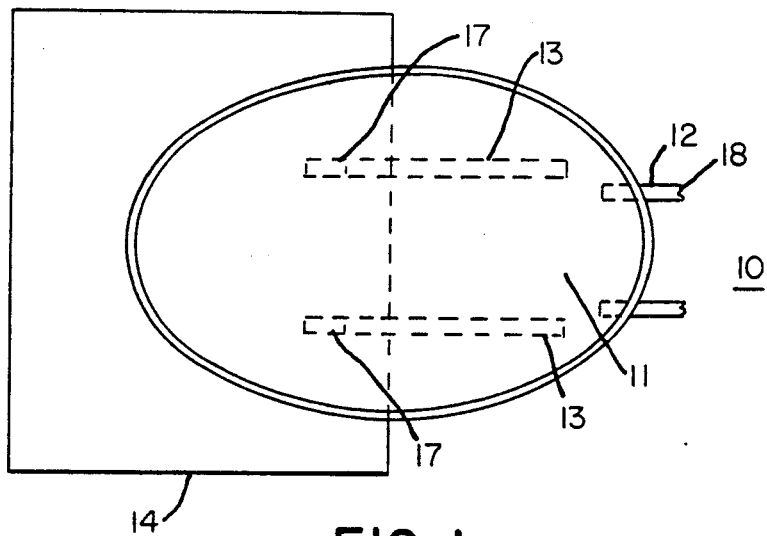
FIG. 1 is a top view of the invention positioned over a saddle blanket.
Figure 2:
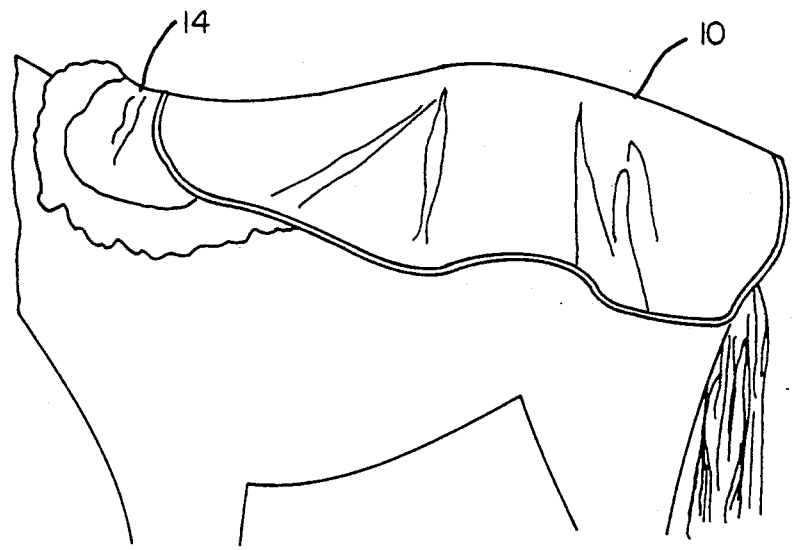
FIG. 2 is a side view of the invention as it is fitted on a horse.

Referring now in more detail to the drawings, FIG. 1 is a top view of the invention showing the relationship and relative position of the invention as it is assembled with the saddle blanket or trail pad. The quarter sheet of the invention, designated generally by the numeral 10, comprises a pear shaped, single sided piece of eight ounce GORE-TEX $_{TM}$ fabric 11. GORE-TEX is a registered trademark of Wilgore Associates Incorporated, and is constructed of an outer fabric, an inner membrane, and a lining. Fabric 11 is constructed so as to allow the small moisture molecules of sweat to evaporate, but the rain molecules, which are larger, will not go through. In a preferred embodiment the fabric 11 was cut in an oval shape approximately 40"×45".

Figure 3:
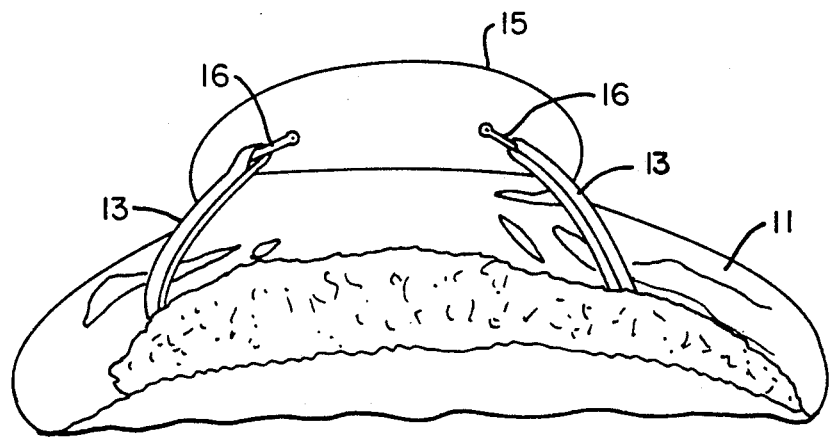
FIG. 3 is an end view of the invention in a rolled-up condition.
Figure 4:
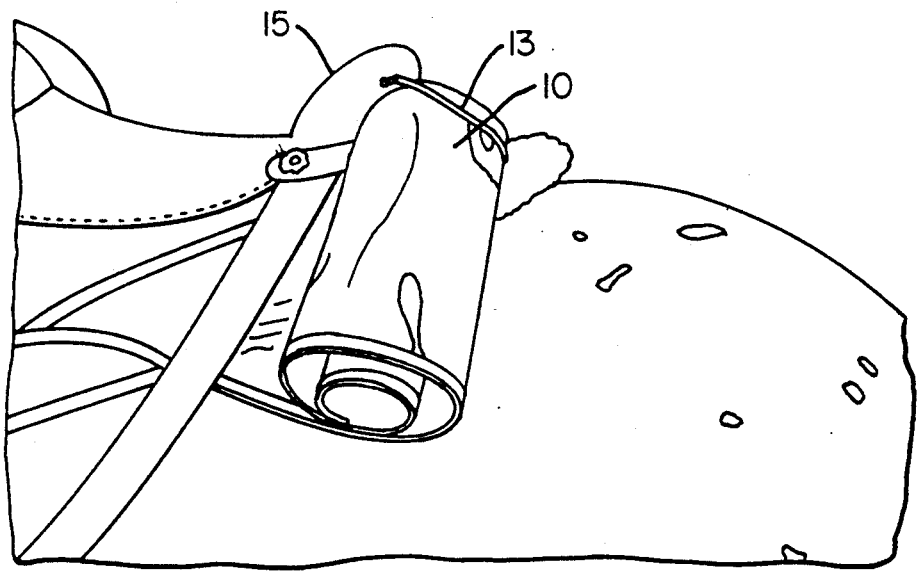
FIG. 4 is a side view of the invention in a rolled-up condition.
Figure 5:
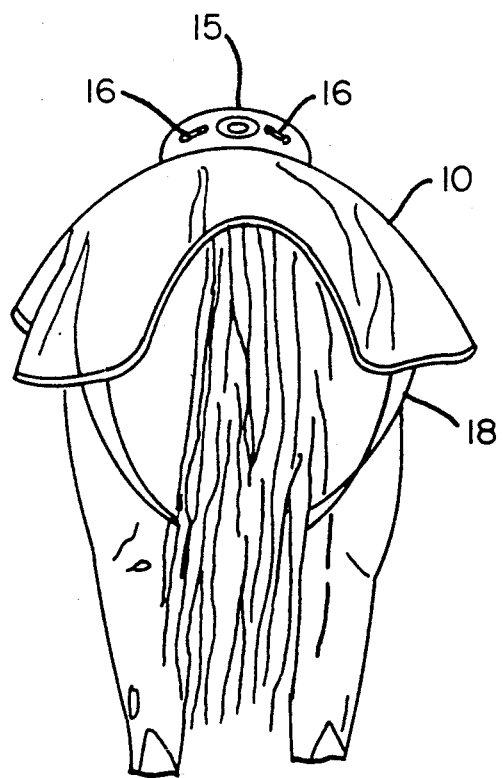
FIG. 5 is an end view of the invention as it is fitted on a horse.

The oval shaped fabric 11 is bound on the edge with nylon web 12 for better wearing and strength. Attached to the bottom side of fabric 11 are two VELCRO saddle straps 13. VELCO, a registered Trademark of VELCRO USA Inc., 406 Brown Avenue, Manchester, N.H. 03108, is a self gripping fastening system which requires no screws, bolts or nails. VELCRO consists of a loop tape and a hook tape which when fastened together, holds tight against a direct pull and peels apart easily when desired. In a preferred embodiment the straps 13 were $\frac{3}{4}"\times 8"$. As shown in FIGS. 1 and 4, straps 13 are fastened at 17 in a position on fabric 11 to fit between the saddle pad 14 and saddle 15. Quarter sheet 10 is held securely by placement well up between the saddle 15 and saddle pad 14. As shown in FIGS. 3 through 5, footman loops 16 or a crupper ring (not shown) may be used for fastening the quarter sheet 10, in a rolled condition, to the saddle 15. The quarter sheet 10 rolls up and fastens with Velcro straps 13 to footman loops 16 behind the saddle 15, whether English or Western, and unfolds easily when needed. A tail strap 18, as shown in FIG. 5, fastened to the bottom of quarter sheet 10 near the tail end, keeps the quarter sheet 10 in place. There is ample space in the rolled up quarter sheet 10 to stow a raincoat or jacket within the Velcro closure.

Designed for an endurance rider, and tested for the sport of long-distance riding, the RUMP RUG $_{TM}$ is a useful addition to any rider's equipment. The RUMP RUG $_{TM}$ is an ideal product for three-day eventers, hunter-jumpers, fox hunters, endurance riders, trail riders, and other equine sports participants.

While the invention has been explained with respect to a preferred embodiment thereof, it is contemplated that various changes may be made in the invention without departing from the spirit and scope thereof.

What is claimed is:

1. A roll up quarter sheet assembled with a saddle and a saddle pad for providing hind quarter protection for a horse comprising:
   an oval shaped, waterproof, GORE-TEX ™ material, said material having a forward end, a rearward end, a bottom and top side, and an outer edge, said oval shape being sized to have said forward end held in place by said saddle and saddle pad and not extending forward beyond said saddle, and said outer edge extending no further than half way down said hind quarter,
   a nylon web fastened around said outer edge of said material,
   a pair of self gripping straps fastened to said material on said bottom side and located in proximity to said forward end, and
   a tail strap fastened to said material on said bottom side near said rearward end.

2. A roll up quarter sheet as claimed in claim 1, wherein said GORE-TEX ™ is an oval shape approximately 40"×45".

3. A roll up quarter sheet assembled with a saddle and a saddle pad for providing hind quarter protection for a horse comprising:
   an oval shaped GORE-TEX ™ material approximately 40"×45", said material having a forward end, a rearward end, a bottom and top side, and an outer edge, said oval shape being sized to have said forward end held in place by said saddle and saddle pad and not extending forward beyond said saddle, and said outer edge extending no further than half way down said hind quarters,
   a nylon web fastened around said outer edge of said material,
   a pair of VELCRO ™ straps fastened to said material on said bottom side and located in proximity to said forward end, and,
   a nylon tail strap fastened to said material on said bottom side near said rearward end.

4. Horseback riding gear for providing hind quarter protection for a horse comprising:
   a saddle having fastening means affixed thereto,
   a saddle pad, and
   an oval shaped, waterproof, GORE-TEX ™ fabric material, said material having:
   a forward end, a rearward end, a bottom and top side, and an outer edge, said oval shape being sized to have said forward end held in place by said saddle and said saddle pad and not extending forward beyond said saddle, and said outer edge extending no further than half way down said hind quarter,
   a nylon web fastened around said outer edge of said material,
   a pair of VELCRO ™ straps fastened to said material on said bottom side and located in proximity to said forward end, said straps being adapted to be fastened to said saddle fastening means, and
   a tail strap fastened to said material on said bottom side near said rearward end.

* * * * *